(12) United States Patent
Lang, Jr.

(10) Patent No.: US 7,611,117 B1
(45) Date of Patent: Nov. 3, 2009

(54) LAPTOP COMPUTER DOCUMENT HOLDER

(76) Inventor: Joseph Lang, Jr., 607 School St., Kenedy, TX (US) 78119

( * ) Notice: Subject to any disclaimer, the term of this patent is extended or adjusted under 35 U.S.C. 154(b) by 0 days.

(21) Appl. No.: 12/222,375

(22) Filed: Aug. 7, 2008

(51) Int. Cl.
*A47B 97/04* (2006.01)

(52) U.S. Cl. .............. 248/452; 248/125.8; 248/126; 248/205.3; 248/918

(58) Field of Classification Search .......... 248/452, 248/451, 205.3, 918, 126, 125.8
See application file for complete search history.

(56) References Cited

U.S. PATENT DOCUMENTS

| | | | |
|---|---|---|---|
| 2,083,839 A * | 6/1937 | Grieve | 248/448 |
| 2,232,904 A | 2/1941 | Doria | |
| D199,828 S | 12/1964 | Regan | |
| 4,323,214 A * | 4/1982 | DeLuca | 248/452 |
| 4,958,907 A * | 9/1990 | Davis | 359/809 |
| D327,501 S | 6/1992 | Maloney | |
| 5,301,915 A | 4/1994 | Bahniuk et al. | |
| D348,081 S | 6/1994 | Cady | |
| 5,549,268 A | 8/1996 | Hopwood | |
| 5,620,162 A | 4/1997 | Beckwith | |
| 5,725,191 A | 3/1998 | Nemeth | |
| 6,367,760 B1 | 4/2002 | Pagano | |
| 6,851,656 B2 * | 2/2005 | Bauman et al. | 248/442.2 |
| 7,028,966 B2 | 4/2006 | Bauman et al. | |
| 7,118,083 B2 | 10/2006 | Liang | |
| 7,240,444 B1 | 7/2007 | Rodriguez | |
| 2004/0228077 A1 | 11/2004 | Hall et al. | |
| 2008/0283715 A1 * | 11/2008 | Morrison | 248/467 |

* cited by examiner

*Primary Examiner*—Amy J. Sterling
(74) *Attorney, Agent, or Firm*—Richard C. Litman

(57) ABSTRACT

The laptop computer document holder is an unobtrusive plastic sheath with two plastic telescopic arms for moving in and out of the sheath. One of the telescopic arms has a top with a document clipper for clipping the document to the top when the telescopic arms are extended. This clipper secures the document at eye level above a screen or monitor of the laptop computer. The plastic sheath has a flat face with adhesive tape affixed for permanently attaching the plastic sheath to the laptop computer. Once the document holder is attached to the laptop computer, the holder cannot be misplaced or lost. Thus, the laptop computer holder is readily available and accessible when needed to hold a document at eye level above the laptop computer.

4 Claims, 6 Drawing Sheets

LAPTOP COMPUTER DOCUMENT HOLDER

BACKGROUND OF THE INVENTION

1. Field of the Invention

The present invention relates to a document holder attached to a laptop computer to hold a document at eye level when space is limited.

2. Description of the Related Art

In the field of computers, it is well known that laptop computers are popular. They are very portable and the costs associated are dramatically reducing while the utility is ever increasing. Many people use laptop computers while traveling, especially in airports, on airplanes, and in hotel rooms. Furthermore, students are replacing their desktop models or using laptops in tandem, because of portability in and out of the classroom.

But, many common uses for laptop computers do not lend themselves to appropriate environments for placement of documents for viewing while typing. Students, using a laptop in class, libraries, or in lecture halls, have limited space on desks, chairs, or tables being occupied. Similarly, in coffee shops or other eateries, many areas of occupation do not facilitate the spreading of the document in areas used by others. Additionally, while using a laptop computer on an airplane, it would be better the document was held or positioned above the computer, instead of either to the left or right because of interference with another's space.

Of course, there are gadgets and devices that clip on the laptop and hold a document to the side or near the display of the laptop, but these devices are not permanently attached, nor do they position the document at eye level above the laptop computer. Because, these devices or gadgets are not permanently attached to the laptop, they are easily lost, misplaced, or just forgotten before the need arises for their use. Furthermore, they position the document, not at eye level above the display, but to the side interfering with someone else's workspace or comfort zone. Thus, a laptop computer document holder solving the aforementioned problems is desired.

SUMMARY OF THE INVENTION

The laptop computer document holder for a laptop computer has a sheath base with a flat face for affixing an adhesive member. The adhesive member permanently attaches the flat face of the laptop computer document holder to the laptop computer. Once the document holder is attached to the laptop computer, the holder cannot be misplaced or lost. There is also a telescopic arm that is collapsible and extendable. The telescopic arm is protectively held in the sheath base and extends out of the sheath base above the laptop computer. A clip is attached to the telescopic arm and is used to clip at least one document to the laptop computer document holder when the telescopic arm is extended above the laptop computer. Thus, the laptop computer holder permanently affixed to the laptop computer is readily available and accessible when needed to hold a document at eye level above the laptop computer.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
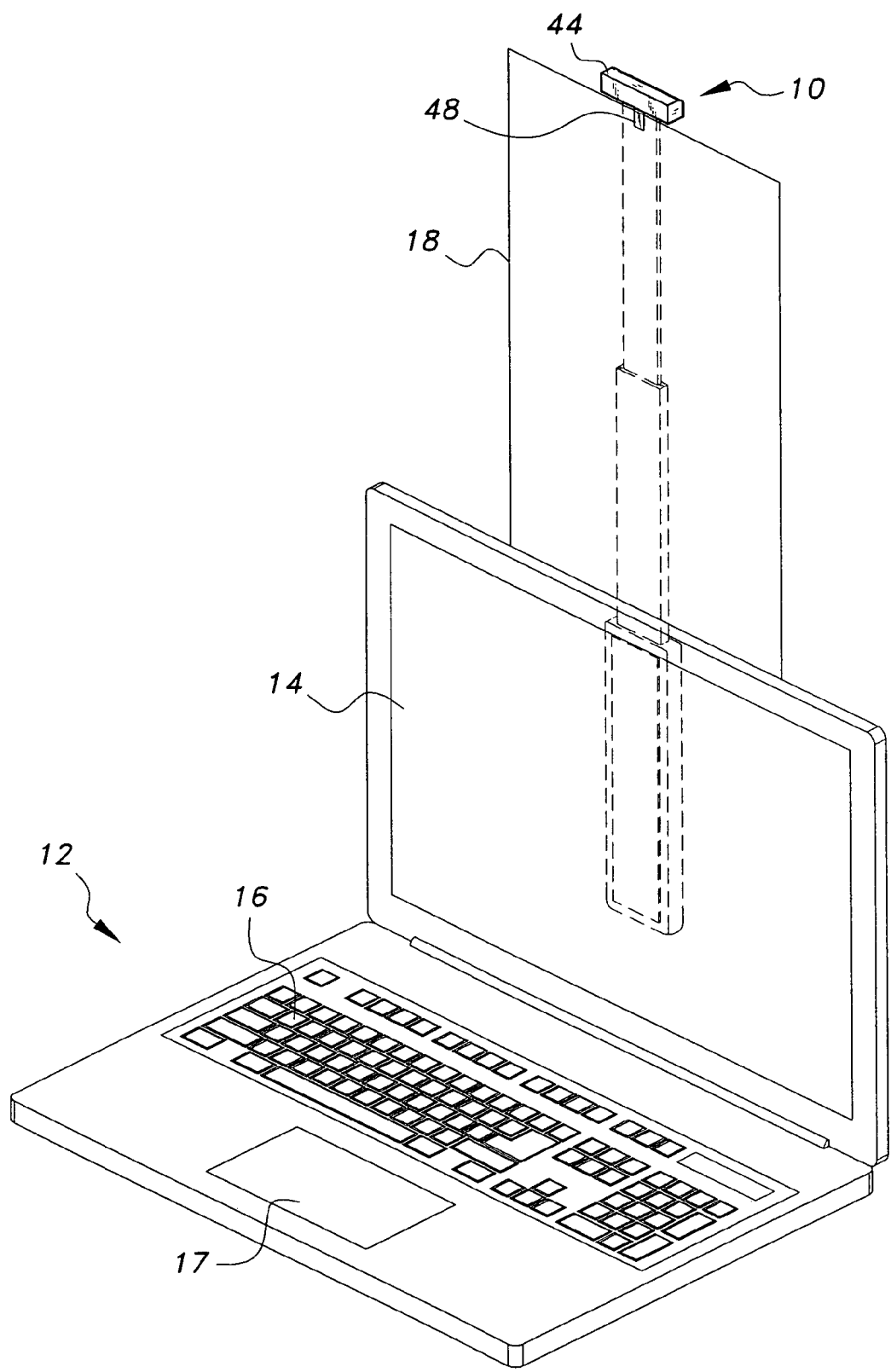
FIG. 1 is an environmental, perspective view of a laptop computer document holder attached to a laptop computer and holding a document at eye level according to the present invention.

FIG. 1 shows an environmental, perspective view of a laptop computer document holder, generally indicated by the numeral 10. The laptop computer document holder 10 is attached to a laptop computer, generally indicated with the numeral 12. The laptop computer 12 can be any type of laptop or notebook computer. All that is required is an area to attach the laptop computer document holder 10. As can be see, the holder 10 is attached to a back of a monitor or display 14 of the laptop computer 12. The holder 10 is fully extended by grasping top head member 44. A document 18 is attached to the document holder 10. A gripper or clipping member 48 clips and holds the document 18 above the monitor 14 of the laptop computer 12. With the document 18 clipped to the clipping member 48, the top of the monitor stabilizes the document 18. Thus, the holder 10 is out of the way of keyboard 16 or mouse pad 17, and the document 18 is read at eye level.

Figure 2:
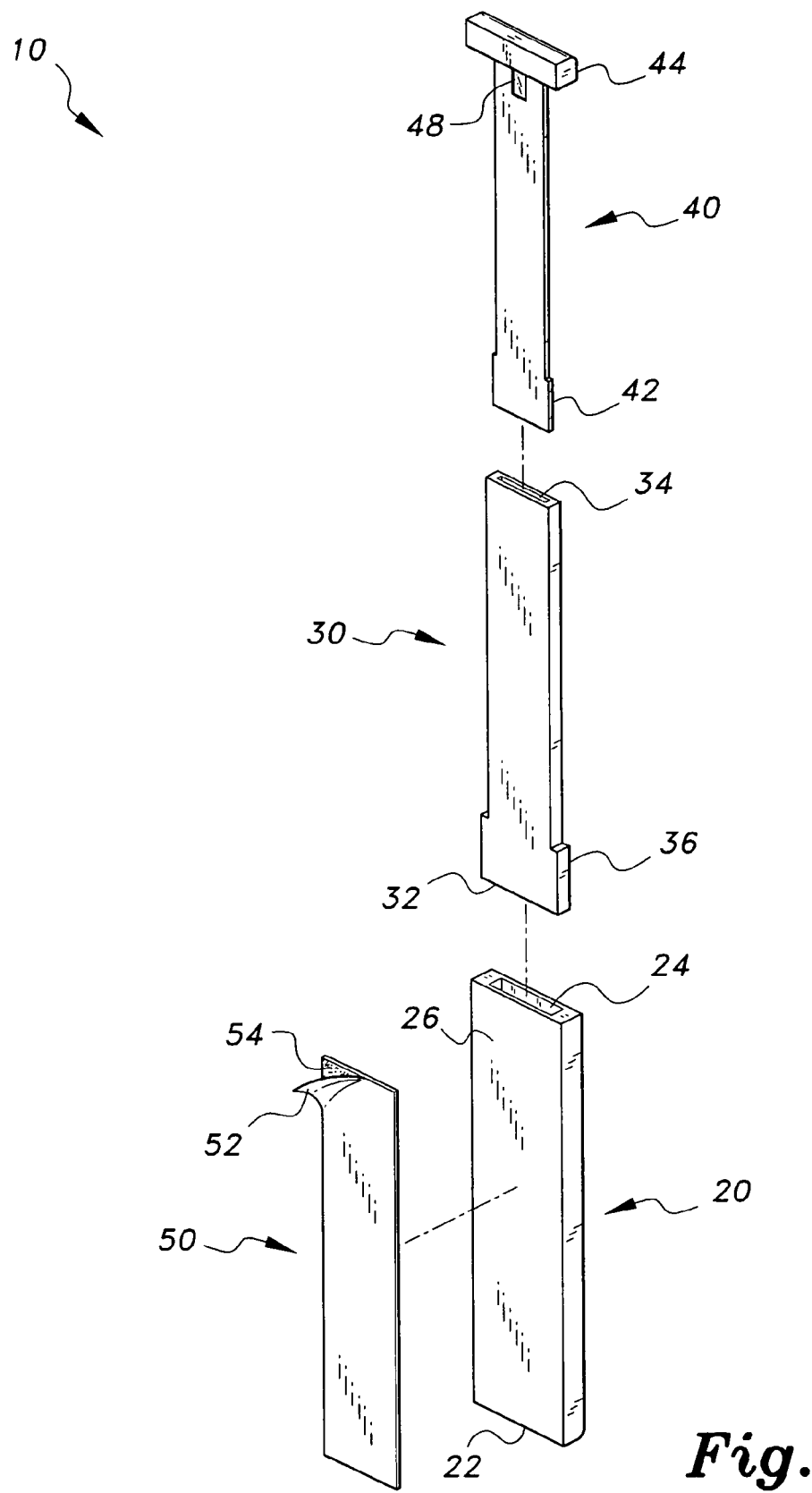
FIG. 2 is an exploded perspective view of the laptop computer document holder according to the present invention.

As shown in FIG. 2, there is a base 20 that is a protective cover. The base 20 is made of plastic and has a rectangular shape with a closed bottom 22, an opened top 24, and a smooth rectangular face 26. Thus, forming a sheath to protect the laptop computer document holder 10.

A next part of the holder 10 is a telescopic arm or slide 30 that collapses, extends, and is protectively held in the sheath base 20. This telescopic slide 30 also has a closed bottom 32 and an open top 34 and is made of plastic. The slide bottom 32 has a wider part or stop 36 that is slightly wider then the opened top 24 of the sheath base 20 for acting as a stop member 36. The remaining width of the telescopic slide 30 is the same width as the opened top 24 of the sheath base 20 to slide in and out of the sheath base 24. The stop member 36 providing a friction type fit and together with a tilt angle provided by the laptop computer display 14 maintain the telescopic slide 30 in position when expanded.

A second telescopic arm or extender 40 is a solid piece of plastic. This telescopic extender 40, also, collapses, extends, and is protectively held in the sheath base 20. However, this telescopic extender 40 first collapses, extends, and is protectively held in the telescopic slide 30. Thus, completing a telescopic arm like member collapsing and extending from the protective sheath base 20.

The telescopic extender 40 has a wide base or stop 42 that is slightly wider then the opened top 34 of the telescopic slide 30 for stopping the extender 40 when extended out from the slide 30. The remaining width of the telescopic extender 40 is the same width as the opened top 34 of the telescopic slide 30 to permit in and out extending. The stop member 42 provides a friction type fit and together with a tilt angle provided by the laptop computer display 14 maintains the extender 40 in position when extended.

The telescopic extender 40 includes the top or head member 44. The head member 44 provides at least two functions for the laptop computer document holder 10. First, the top head member 44 provides a protective cover for the holder 10 when in a collapsed or closed position. The top head member 44 is the same size and shape as top of the sheath base 20. So, as holder 10 telescopically collapses like an antenna, the extender 40 will collapse into the slide 30, both will then collapse into the base 20, and the top head member 44 covers and seals both open tops 24 and 34. Secondly, the head member 44 protects and holds the gripping member 48. The head member 44 provides a readily available handle or lever for one to operate the gripper 48.

In an open or expanded position, the top head member 44 includes the gripper or clip 48. This clipping member 48 grips or clips to the document 18 when extended and securely holds the document 18.

Lastly, in accordance with the invention, is an adhesive member or strip 50. The adhesive strip 50 nearly covers the face 26 of the sheath base 20. The adhesive strip 50 is permanently attached to the face 26 of the sheath base 20 and has a peel away part 52. The peel away part 52 once removed exposes an adhesive section 54 that is used to permanently mount or fix the laptop computer document holder 10 to the laptop computer 12. Once the laptop computer holder 10 is permanently affixed or attached to the laptop computer, the holder 10 cannot be lost, misplaced or forgotten. Thus, the holder 10 is readily accessible and available when needed.

Figure 3:
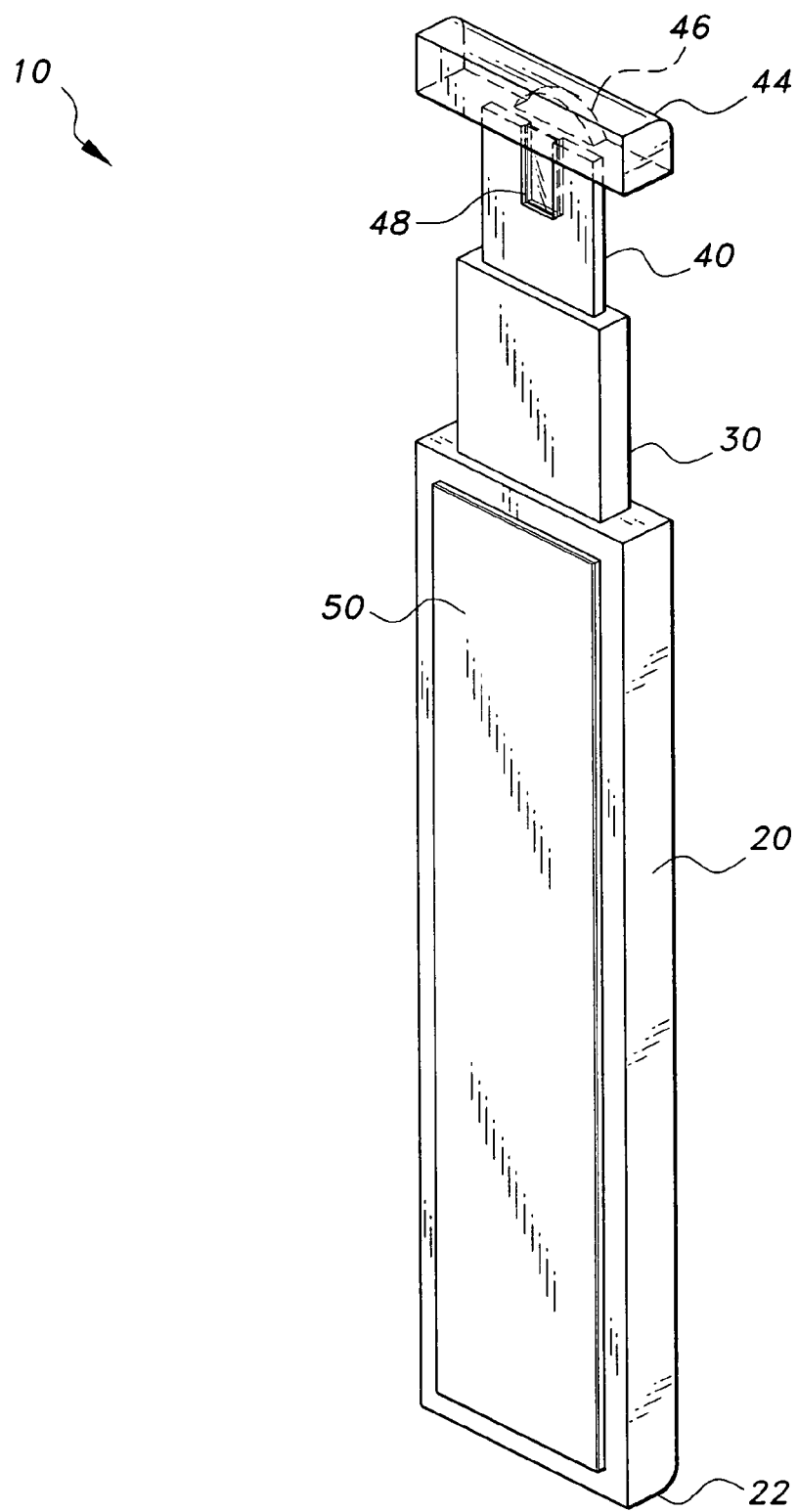
FIG. 3 is a perspective view of the laptop computer document holder according to the present invention partially extended.

Looking now at FIG. 3, the bottom 22 of the base 20 is shown as rounded adding to a sleek and unobtrusive design. The holder 10 could be considered an accessory for the laptop computer 12, because the holder 10 facilitates a holding of a document for reading at eye level. The document holder 10 consisting of the plastic sheath 20 that contains and encloses two telescoping pieces or slide 30 and expander 40 that are made of plastic and telescopically extend or expand so that the document 18 can then be attached using the gripper or clip 48. The top head member 44 includes a cutout 46 and this cutout 46 has the gripper or clip 48 extending into the cutout 46. The cutout 46 is pressed inwardly and this raises the bottom of the gripper 48 for receiving the document 18. Additionally, the cutout 46 provides an opening function wherein, to expand the holder 10, the cutout 46 is slightly pushed inwardly and pulled upwardly to place the telescopic slide 30 and expander 40 in a position above the base 20 so as to receive the document 18. The holder 10 is intended to function as an integral part of the laptop computer 12 after being affixed by the adhesive strip 50. Thus, ensuring the holder 10 will not be misplaced or lost, because the holder 10 is permanently attached to the laptop computer 12.

Figure 4:
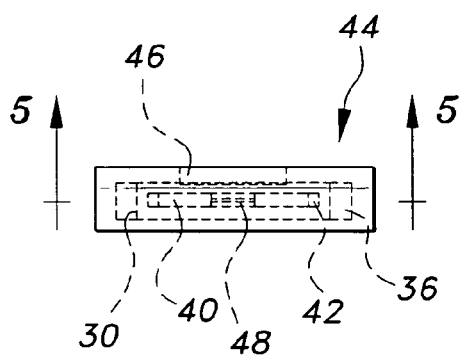
FIG. 4 is a top plan view of the laptop computer document holder according to the present invention.

As shown in FIG. 4, the sleek design is evident through this view of the top head member 44. While one side 56 of the top head member 44 is flat, the other side has corners 58, 59 that are curved or rounded to eliminate sharp edges on the holder 10. The cutout 46 having clipping member 48 centered therein and allows the clipping member 48 to move in and out similar to a swing door.

Figure 5:
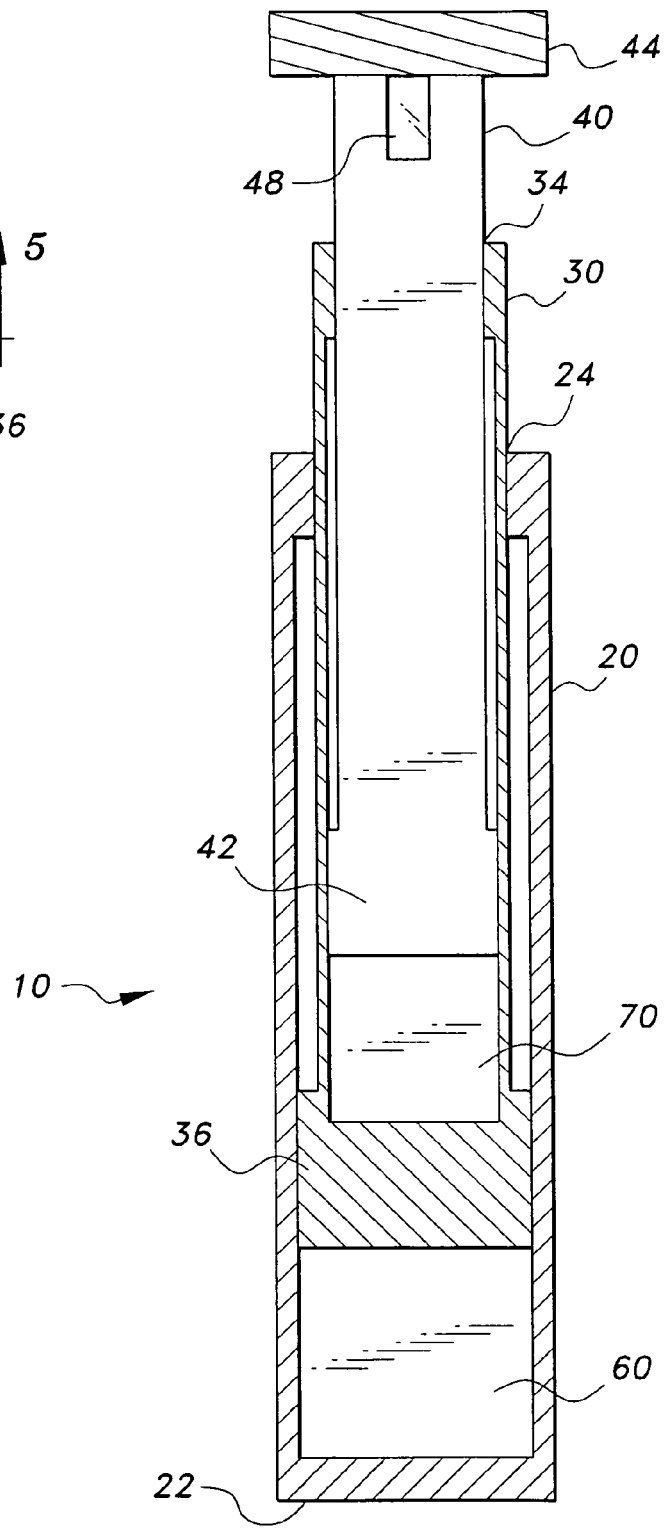
FIG. 5 is a section view taken along lines 5-5 of FIG. 4.

With reference to FIG. 5, the holder 10 is partially extended so as to illustrate cavities of the sheath base 20 and the telescopic slide 30. Looking at the base 20, a base cavity 60 is seen. The base cavity 60 is the same width throughout the base 20 until reaching the opened top area 24. Here, the base cavity 60 becomes smaller or not as wide. As can be seen, the stop member 36 of the telescopic slide 30 is the same width as the base cavity 60. This permits the telescopic slide 30 to move in and out of the base cavity 60, but is then stopped at the opened top 24, because the stop member 36 is wider than the opened top 24.

Similarly, looking at the telescopic slide 30, it has a slide cavity 70. The slide cavity 70 is the same width throughout until reaching the opened top area 34. Here, the slide cavity 70 becomes smaller or not as wide. As can be seen, the bottom 42 of the telescopic expander 40 is the same width as the slide cavity 70. This permits the telescopic expander 40 to move in and out of the slide cavity 70, but is then stopped at the opened top 34 because the bottom 42 is wider than the opened top 34. Accordingly, the telescopic slider 30 and the telescopic expander 40 can collapse and expand easily by the moving the top head member 44 up or down.

Figure 6:
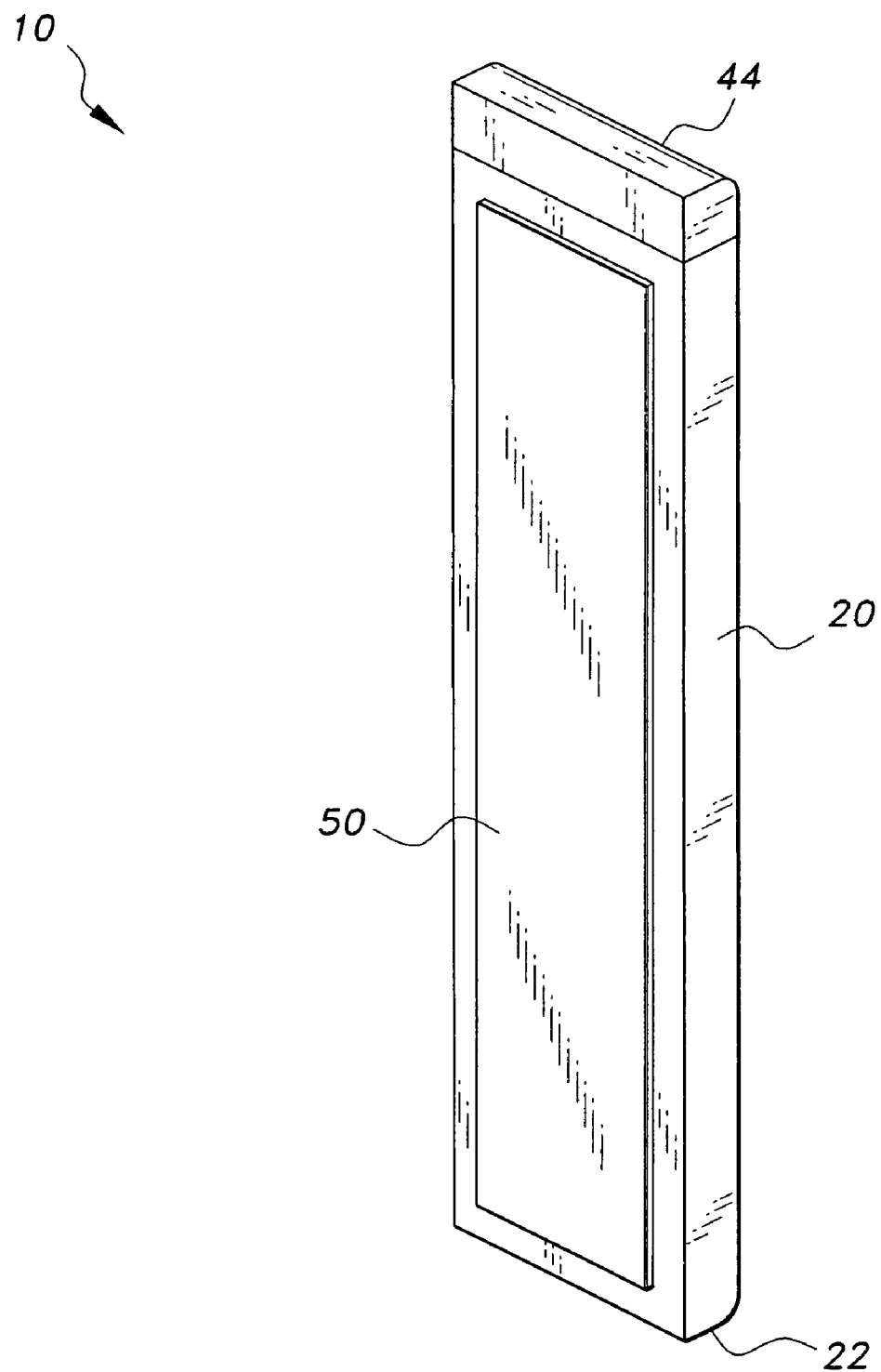
FIG. 6 is a perspective view of the laptop computer document holder according to the present invention in a fully closed position.

As shown in FIG. 6, the protective sheath base 20 encloses the two telescopic members, slide 30 and expander 40, that have collapsed into the base 20. The top head member 44 completes the protective covering of the holder 10 with the cutout 46 exposed for opening or expanding the laptop document holder 10. The adhesive member 50 is shown prepared to permanently attach the holder 10 to the laptop computer 12.

Figure 7:
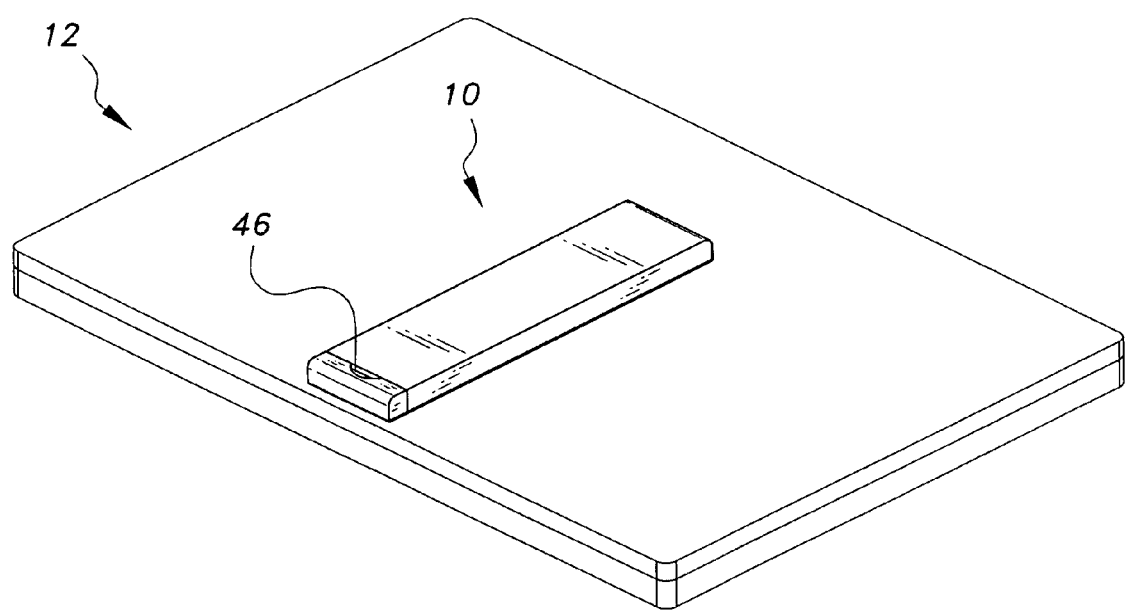
FIG. 7 is an environmental perspective view of the laptop computer document holder according to the present invention permanently attached to the laptop computer and in the closed position.

Referring to FIG. 7, the holder 10 has a sleek and unobtrusive design. After being adhesively and permanently attached to the laptop computer 12, the holder 10 is readily accessible to be opened and expanded telescopically to hold a document at eye level. The holder 10 is mounted slightly below the top of the monitor 14 and with its rounded edges the holder 10 is aesthetically pleasing to the eye. The cutout 46 is utilized to open and expand the holder 10 by merely entering it with a tip of a finger and pulling or pushing depending on the position of the user.

It is to be understood that the present invention is not limited to the embodiment described above, but encompasses any and all embodiments within the scope of the following claims.

I claim:

1. A laptop computer document holder for a laptop computer, consisting of:

an elongated, rectangular sheath base, said sheath base having a closed bottom surface and an open top surface forming an elongated rectangular slot from the top surface to the closed bottom surface, said top surface defining a stop flange adjacent the top surface and within the slot;

means for attaching the sheath base of the laptop computer document holder to the laptop computer;

a telescopic arm movable between a retracted position and an extended position, the arm being protectively held in the sheath base in the retracted position and extended out of the sheath base above the laptop computer in the extended position, the telescopic arm including:

i) a first telescopic rectangular piece forming a lower part of said telescopic arm and fitting inside the rectangular slot of the sheath base in the retracted position, said first piece having a closed bottom surface and an open top surface forming an elongated rectangular slot from the top surface to the closed bottom surface, said top surface defining a stop flange adjacent the top surface and within the slot, said first piece further including an external flange adjacent the bottom surface, whereby the first piece is adapted to extend nearly out of the sheath base above the laptop computer in the extended position when the external flange engages the stop flange in the sheath, ii) a second telescopic rectangular piece forming an upper part of said telescopic arm, the second piece fitting inside the first telescopic piece in the retracted position, said second piece further including an external flange adjacent the bottom surface, whereby the second piece is adapted to extend nearly out of the first piece above the laptop computer in the extended position when the external flange engages the stop flange in the first piece; and a clip attached to the second telescopic piece adapted for clipping at least one document to the laptop computer document holder when the second telescopic piece is in the extended position.

2. The laptop computer document holder according to claim 1, wherein the means for attaching the sheath base of the laptop computer document holder comprises adhesive.

3. The laptop computer document holder according to claim 2, wherein the adhesive comprises a strip covering part of the sheath base.

4. The laptop computer document holder according to claim 1, wherein the sheath base and each of the telescopic pieces are made of plastic.

* * * * *